(12) United States Patent
Kawakami

(10) Patent No.: US 11,643,328 B2
(45) Date of Patent: May 9, 2023

(54) METHOD OF PRODUCING SURFACE-TREATED CARBON NANOSTRUCTURES

(71) Applicant: ZEON CORPORATION, Tokyo (JP)

(72) Inventor: Osamu Kawakami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 330 days.

(21) Appl. No.: 16/489,484

(22) PCT Filed: Feb. 19, 2018

(86) PCT No.: PCT/JP2018/005774
§ 371 (c)(1),
(2) Date: Aug. 28, 2019

(87) PCT Pub. No.: WO2018/168346
PCT Pub. Date: Sep. 20, 2018

(65) Prior Publication Data
US 2019/0367370 A1 Dec. 5, 2019

(30) Foreign Application Priority Data
Mar. 16, 2017 (JP) .............................. JP2017-051114

(51) Int. Cl.
*B32B 9/00* (2006.01)
*C01B 32/174* (2017.01)
*C01B 32/159* (2017.01)
*B82Y 30/00* (2011.01)
*B82Y 40/00* (2011.01)

(52) U.S. Cl.
CPC .......... *C01B 32/174* (2017.08); *C01B 32/159* (2017.08); *B82Y 30/00* (2013.01); *B82Y 40/00* (2013.01); *C01B 2202/02* (2013.01); *C01P 2004/02* (2013.01); *Y10T 428/30* (2015.01)

(58) Field of Classification Search
USPC ........................................................ 428/408
See application file for complete search history.

(56) References Cited

U.S. PATENT DOCUMENTS

| 2005/0002850 A1 | 1/2005 | Niu et al. |
| 2008/0318049 A1 | 12/2008 | Hata et al. |
| 2015/0329693 A1 | 11/2015 | Shigeta et al. |

FOREIGN PATENT DOCUMENTS

| JP | 2003505332 A | 2/2003 |
| JP | 2014101233 A | 6/2014 |

(Continued)

OTHER PUBLICATIONS

Sep. 17, 2019, International Preliminary Report on Patentability issued in the International Patent Application No. PCT/JP2018/005774.

*Primary Examiner* — Daniel H Miller
(74) *Attorney, Agent, or Firm* — Kenja IP Law PC

(57) ABSTRACT

Disclosed is a method of producing surface-treated carbon nanostructures which comprises: a depressurization step wherein a carbon nanostructure-containing liquid which comprises carbon nanostructures and a dispersion medium is depressurized; and a surface treatment step wherein an oxidizing agent is added in the carbon nanostructure-containing liquid after or during the depressurization step so that the carbon nanostructures have a surface oxygen atom concentration of 7.0 at % or more. The carbon nanostructures preferably comprise carbon nanotubes.

9 Claims, 1 Drawing Sheet

Example 1

Example 2

(56) References Cited

FOREIGN PATENT DOCUMENTS

| WO | 2006011655 A1 | 2/2006 |
|----|---------------|--------|
| WO | 2014097626 A1 | 6/2014 |
| WO | 2016013219 A1 | 1/2016 |

Example 1

Example 2

Comparative Example 1

Comparative Example 2

METHOD OF PRODUCING SURFACE-TREATED CARBON NANOSTRUCTURES

TECHNICAL FIELD

The present disclosure relates to methods of producing surface-treated carbon nanostructures and, in particular, to methods producing carbon nanostructures surface-treated using an oxidizing agent.

BACKGROUND

Recently, various nanostructures such as nanocarbons, nanofibers and nanowires have attracted attention as materials with various excellent properties such as mechanical properties. Of them, fibrous carbon nanostructures such as nanocarbons, particularly carbon nanotubes (hereinafter also referred to as "CNTs") are attracting attention as materials excellent in conductivity, thermal conductivity and mechanical properties.

Techniques have attracted attention that allow carbon nanostructures such as CNTs to exhibit even better properties by subjecting them to various surface treatments.

Specifically, PTL 1, for example, discloses obtaining surface-treated carbon nanotubes that have excellent strength and toughness at high temperatures by treating the surface of carbon nanotubes with an ethylene/maleic anhydride copolymer so that they have a surface oxygen concentration of 3.0 to 30 at % as measured by X-ray photoelectron spectroscopy (XPS).

Additionally, PTL 2, for example, disclose obtaining oxidized multi-walled carbon nanotubes having improved dispersibility in water by contacting multi-walled carbon nanotubes with a gas phase oxidizing agent.

CITATION LIST

Patent Literature

PTL 1: JP2014-101233A
PTL 2: JP2003-505332A

SUMMARY

Technical Problem

Because carbon nanostructures such as CNTs are microscopic structures which are nanometers in size, it is difficult to handle and process them alone. To address this problem, carbon nanostructures are either aggregated to form a film or combined with polymeric materials such as resin or rubber or with metals to form complex materials, before they are used in various applications. Proposed methods of forming an aggregate of carbon nanostructures include removing, from a carbon nanostructure dispersion containing carbon nanostructures dispersed in a dispersion medium, the dispersion medium. Proposed methods of forming a complex material containing carbon nanostructures include depositing or precipitating a complex material from a complex material composition which is obtained by mixing a matrix material such as a polymeric material with a carbon nanostructure dispersion.

From the viewpoint of allowing aggregates or composites material of carbon nanostructures to exert excellent characteristics, as carbon nanostructure dispersions used to form such aggregates or composite materials, carbon nanostructure dispersions in which carbon nanostructures are well dispersed in the dispersion medium have been required.

However, with the conventional surface-treated carbon nanotubes and oxidized multi-walled carbon nanotubes described above, dispersions having excellent dispersion stability of carbon nanotubes cannot be obtained.

An object of the present disclosure is therefore to provide carbon nanostructures which can be used to prepare a carbon nanostructure dispersion having excellent dispersion stability.

Solution to Problem

The inventor has made extensive studies to solve the foregoing problem and established that carbon nanostructures having excellent dispersion stability in liquids can be obtained by, after or during depressurization of a carbon nanostructure-containing liquid containing carbon nanostructures and a dispersion medium, adding an oxidizing agent in the carbon nanostructure-containing liquid such that the carbon nanostructures have a surface oxygen atom concentration of a specific value or more. The inventor thus completed the present disclosure.

Specifically, the present disclosure aims to advantageously solve the foregoing problem, and a disclosed method of producing surface-treated carbon nanostructures comprises: a depressurization step wherein a carbon nanostructure-containing liquid which comprises carbon nanostructures and a dispersion medium is depressurized; and a surface treatment step wherein an oxidizing agent is added in the carbon nanostructure-containing liquid after or during the depressurization step so that the carbon nanostructures have a surface oxygen atom concentration of 7.0 at % or more. By adding an oxidizing agent in a carbon nanostructure-containing liquid after or during the depressurization step so that carbon nanostructures have a surface oxygen atom concentration of 7.0 at % or more in this way, it is possible to obtain carbon nanostructures which can be used to prepare a carbon nanostructure dispersion having excellent dispersion stability.

The "surface oxygen atom concentration" herein can be measured by X-ray photoelectron spectroscopy (XPS).

In the disclosed method of producing surface-treated carbon nanostructures, it is preferred that, in the depressurization step, the carbon nanostructure-containing liquid is depressurized to a pressure that is not more than two times a vapor pressure of the dispersion medium at a temperature of the dispersion medium during depressurization. By depressurizing the carbon nanostructure-containing liquid to a pressure that is not more than two times the vapor pressure of the dispersion medium at a temperature of the dispersion medium during depressurization in the depressurization step, it is possible to obtain carbon nanostructures having further improved dispersion stability in carbon nanostructure dispersions.

The "vapor pressure" herein can be measured in accordance with JIS Z8806 (when the dispersion medium is water) or JIS K2258 (when the dispersion medium contains an organic solvent).

In the disclosed method of producing surface-treated carbon nanostructures, it is preferred that an operation in which the carbon nanostructure-containing liquid is depressurized for 20 minutes or more is carried out one or more times in the depressurization step. By performing such an operation one or more times, it is possible to obtain carbon nanostructures having further improved dispersion stability in carbon nanostructure dispersions.

In the disclosed method of producing surface-treated carbon nanostructures, it is preferred that the concentration of the carbon nanostructures in the carbon nanostructure-containing liquid is 5% by mass or less. When the concentration of the carbon nanostructures in the carbon nanostructure-containing liquid to be depressurized is 5% by mass or less, it is possible to obtain carbon nanostructures having further improved dispersion stability in carbon nanostructure dispersions.

In the disclosed method of producing surface-treated carbon nanostructures, it is preferred that the oxidizing agent is at least one compound selected from the group consisting of nitric acid, sulfuric acid, hydrogen peroxide, ozone, oxygen, ammonium persulfate, and sodium hypochlorite. By using one or more such oxidizing agents, it is possible to favorably treat the surface of the carbon nanostructures and thus to more easily allow the carbon nanostructures to have a surface oxygen atom concentration of 7.0 at % or more.

In the disclosed method of producing surface-treated carbon nanostructures, it is preferred that the carbon nanostructures exhibit a convex upward shape in a t-plot obtained from an adsorption isotherm. Carbon nanostructures that exhibit a convex upward shape in a t-plot obtained from an adsorption isotherm show a particularly great effect of improving dispersion stability in carbon nanostructure dispersions when subjected to the depressurization step and the surface treatment step.

The "t-plot" is obtained by converting relative pressure to average adsorbed nitrogen gas layer thickness t (nm) in an adsorption isotherm of carbon nanostructures measured by the nitrogen gas adsorption method (t-plot method of de Boer et al.).

In the disclosed method of producing surface-treated carbon nanostructures, it is preferred that the carbon nanostructures satisfy the relationship $0.05 \leq S2/S1 \leq 0.30$, where S1 is a total specific surface area and S2 is an internal specific surface area, S1 and S2 being obtained from a t-plot obtained from an adsorption isotherm. Carbon nanostructures whose S2/S1 is 0.05 or more and 0.30 or less show a particularly great effect of improving dispersion stability in carbon nanostructure dispersions when subjected to the depressurization step and the surface treatment step "Total specific surface area S1" and "internal specific surface area S2" herein can be found for example using BELSORP®-mini ("BELSORP" is a registered trademark in Japan, other countries, or both), a commercially available measurement instrument available from Bel Japan Inc.

In the disclosed method of producing surface-treated carbon nanostructures, it is preferred that the carbon nanostructures comprise carbon nanotubes. Carbon nanostructures which comprise carbon nanotubes are excellent in electrical conductivity, thermal conductivity, mechanical properties etc.

Advantageous Effect

According to the disclosed method of producing surface-treated carbon nanostructures, it is possible to obtain carbon nanostructures which can be used to prepare a carbon nanostructure dispersion having excellent dispersion stability.

BRIEF DESCRIPTION OF THE DRAWINGS

In the accompanying drawings.

DETAILED DESCRIPTION

Figure 1A:
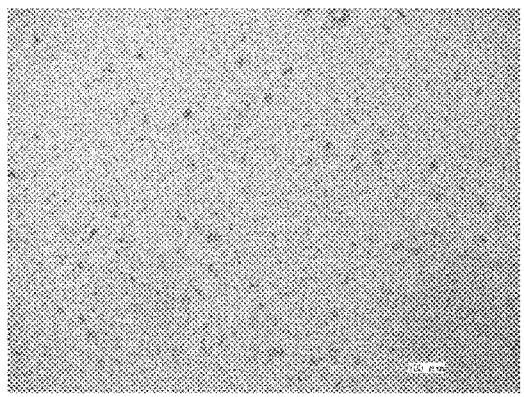
FIGS. 1A to 1D are optical micrographs of carbon nanotube dispersions prepared in Examples 1 and 2 and Comparative Examples 1 and 2.

Embodiments of the present disclosure will be described below in detail.

The disclosed method of producing surface-treated carbon nanostructures is a method of producing carbon nanostructures surface-treated with an oxidizing agent. The surface-treated carbon nanostructures produced by the disclosed production method (hereinafter also simply referred to as "surface-treated carbon nanostructures") can be suitably used for the preparation of a carbon nanostructure dispersion in which carbon nanostructures are dispersed in a solvent such as water.

(Method of Producing Surface-Treated Carbon Nanostructures)

The disclosed method of producing surface-treated carbon nanostructures includes a depressurization step wherein a carbon nanostructure-containing liquid which comprises carbon nanostructures and a dispersion medium is depressurized; and a surface treatment step wherein an oxidizing agent is added in the carbon nanostructure-containing liquid after or during the depressurization step so that the carbon nanostructures have a surface oxygen atom concentration of 7.0 at % or more. With the disclosed production method, it is possible to obtain carbon nanostructures which can be used to prepare a carbon nanostructure dispersion having excellent dispersion stability.

The mechanism by which surface-treated carbon nanostructures produced in accordance with the disclosed production method can provide a carbon nanostructure dispersion having excellent dispersion stability is unclear. A possible mechanism is as follows.

Specifically, because microscopic spaces are present within carbon nanostructures or among aggregated carbon nanostructures, even when the carbon nanostructures are treated with an oxidizing agent as they are, the oxidizing agent cannot sufficiently explore as far as the microscopic spaces, resulting in uneven treatment providing portions treated favorably with the oxidizing agent and portions not treated sufficiently with the oxidizing agent. Unevenly treated carbon nanostructures are susceptible to aggregation because the poorly treated portions serve as aggregation nuclei in the carbon nanostructure dispersion. By contrast, because the disclosed production method adds an oxidizing agent in the carbon nanostructure-containing liquid after or during the depressurization step, the carbon nanostructures can be treated with the oxidizing agent while the dispersion medium is allowed to be sufficiently present also in the microscopic spaces as a result of, for example, gas being released from the microscopic spaces by depressurization. It is thus possible to allow the oxidizing agent to sufficiently explore as far as the microscopic spaces such that the carbon nanostructures are evenly treated with the oxidizing agent. Further, because the evenly treated carbon nanostructures have a surface oxygen atom concentration of 7.0 at % or more in the disclosed production method, it is possible to allow the carbon nanostructures to exert excellent dispersion stability.

<Depressurization Step>

In the depressurization step, a carbon nanostructure-containing liquid which comprises carbon nanostructures and a dispersion medium is depressurized.

[Carbon Nanostructure-Containing Liquid]

The carbon nanostructure-containing liquid comprises carbon nanostructures and a dispersion medium, and may optionally further comprise additives such as dispersing agents. In particular, from the perspective of preventing side reactions with an oxidizing agent to be added in the surface treatment step described later, it is preferred that the carbon nanostructure-containing liquid is free of any additives, comprising only carbon nanostructures and a dispersion medium.

The carbon nanostructure-containing liquid is not particularly limited and can be prepared for example by adding carbon nanostructures in a dispersion medium followed by optional mixing.

[Carbon Nanostructures]

Carbon nanostructures to be surface-treated by the disclosed production method are not particularly limited so long as they are carbon nanostructures of nanometers in size. Any carbon nanostructures can be used herein. Preferred carbon nanostructures are, for example, cylindrical carbon nanostructures such as carbon nanotubes (CNTs) and non-cylindrical carbon nanostructures such as those in which a six-membered ring network of carbon is formed in a flattened cylindrical shape.

Carbon nanostructures to be surface-treated by the disclosed production method usually have a surface oxygen atom concentration of less than 2.4 at %.

In particular, preferred are carbon nanostructures including fibrous carbon nanostructures such as CNTs, because nanostructures including CNTs are excellent in electrical conductivity, thermal conductivity, mechanical properties etc.

Carbon nanostructures including CNTs may be those consisting only of CNTs or may be a mixture of CNTs and carbon nanostructures other than CNTs.

CNTs included in the carbon nanostructures are not particularly limited, and single-walled carbon nanotubes and/or multi-walled carbon nanotubes can be used. Preferred CNTs are single- to 5-walled carbon nanotubes, with single-walled carbon nanotubes being more preferred because carbon nanotubes with fewer walls have better electrical conductivity, thermal conductivity, mechanical properties etc.

Carbon nanostructures including CNTs can be manufactured by any known CNT synthesis methods such as, for example, arc discharging, laser ablation, or chemical vapor deposition (CVD).

Specifically, carbon nanostructures including CNTs can be efficiently produced by the super growth method (see WO2006/011655) wherein during synthesis of CNTs through chemical vapor deposition (CVD) by supplying a feedstock compound and a carrier gas onto a substrate having thereon a catalyst layer for carbon nanotube production, the catalytic activity of the catalyst layer is dramatically improved by providing a trace amount of an oxidizing agent (catalyst activating material) in the system. Hereinafter, carbon nanotubes obtained by the super growth method may also be referred to as "SGCNTs."

The carbon nanostructures produced by the super growth method may consist only of SGCNTs or may include, in addition to SGCNTs, other carbon nanostructures such as non-cylindrical carbon nanostructures.

It is preferred that the carbon nanostructures exhibit a convex upward shape in a t-plot obtained from an adsorption isotherm.

The growth of an adsorbed layer of nitrogen gas for a sample having pores at the surface is divided into the following processes (1) to (3). The gradient of the t-plot changes according to following processes (1) to (3):

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

A t-plot exhibiting a convex upward shape shows a straight line crossing the origin in a region in which the average adsorbed nitrogen gas layer thickness t is small, but the plot deviates downward from the straight line as t increases. Carbon nanostructures whose t-plot shows such a shape indicate that the ratio of internal specific surface area to total specific surface area of the carbon nanostructures is large, which indicate the presence of a large number of openings formed in the carbon nanostructures.

Thus, with carbon nanostructures whose t-plot exhibits a convex upward shape, it is particularly easy to obtain an effect of allowing the carbon nanostructures to be evenly treated with an oxidizing agent by allowing the oxidizing agent to sufficiently explore by carrying out the depressurization step, and an effect of improving the dispersion stability in carbon nanostructure dispersions when the depressurization step and the surface treatment step have been carried out is particularly great.

It is preferred that the t-plot for the carbon nanostructures has a bending point in a range of $0.2 \le t$ (nm)$\le 1.5$, more preferably in a range of $0.45 \le t$ (nm)$\le 1.5$, and even more preferably in a range of $0.55 \le t$ (nm)$\le 1.0$. Carbon nanostructures whose bending point of the t-plot falls within the range described have an even greater effect of improving the dispersion stability in carbon nanostructure dispersions when the depressurization step and the surface treatment step have been carried out.

The "position of the bending point" is an intersection point of an approximate straight line A for process (1) and an approximate straight line B for process (3).

It is further preferred that the carbon nanostructures have a ratio of internal specific surface area S2 to total specific surface area S1 (S2/S1), obtained from a t-plot, of 0.05 or more and 0.30 or less. Carbon nanostructures whose S2/S1 falls within the range described above have an even greater effect of improving the dispersion stability in carbon nanostructure dispersions when the depressurization step and the surface treatment step have been carried out.

Total specific surface area S1 and internal specific surface area S2 of carbon nanostructures can be found from the t-plot. Specifically, first, total specific surface area S1 can be found from the gradient of an approximate straight line corresponding to process (1) and external specific surface area S3 can be found from the gradient of an approximate straight line corresponding to process (3). Internal specific surface area S2 can then be calculated by subtracting external specific surface area S3 from total specific surface area S1.

Measurement of adsorption isotherm, preparation of a t-plot, and calculation of total specific surface area S1 and internal specific surface area S2 based on t-plot analysis for carbon nanostructures can be made using for example BEL- SORP®-mini ("BELSORP" is a registered trademark in Japan, other countries, or both), a commercially available measurement instrument available from Bel Japan Inc.

The carbon nanostructures preferably have a BET specific surface area of 200 m$^2$/g or more, more preferably 400 m$^2$/g or more, and even more preferably 600 m$^2$/g or more, but preferably 2,000 m$^2$/g or less, more preferably 1,800 m$^2$/g or less, and even more preferably 1,600 m$^2$/g or less. Carbon nanostructures having a BET specific surface area in the range described above have an even greater effect of improving the dispersion stability in carbon nanostructure dispersions when the depressurization step and the surface treatment step have been carried out.

The term "BET specific surface area" herein refers to a nitrogen adsorption specific surface area measured by the BET method.

The carbon nanostructures are preferably fibrous carbon nano structures.

The fibrous carbon nanostructures preferably have an average diameter of 1 nm or more, but preferably 60 nm or less, more preferably 30 nm or less, and even more preferably 10 nm or less.

The fibrous carbon nanostructures preferably have an average length of 10 μm or more, more preferably 50 μm or more, even more preferably 80 μm or more, but preferably 600 μm or less, more preferably 500 μm or less, and even more preferably 400 μm or less.

Fibrous carbon nanostructures having an average diameter and/or an average length in the respective ranges described above have an even greater effect of improving the dispersion stability in carbon nanostructure dispersions when the depressurization step and the surface treatment step have been carried out.

The fibrous carbon nanostructures usually have an aspect ratio (length/diameter) of greater than 10.

The average diameter, average length and aspect ratio of the fibrous carbon nanostructures can be obtained by measuring diameters and lengths of 100 randomly-selected fibrous carbon nanostructures by scanning or transmission electron microscopy.

The concentration of the carbon nanostructures in the carbon nanostructure-containing liquid is not particularly limited and is preferably 0.1% by mass or more, more preferably 0.5% by mass or more, and even more preferably 1% by mass or more, but preferably 5% by mass or less, more preferably 3% by mass or less, and still more preferably 2% by mass or less. When the concentration of the carbon nanostructures is not less than lower limit value, it is possible to produce surface-treated carbon nanostructures efficiently. When the concentration of carbon nanostructures is not greater than the upper limit value, it is possible to treat the carbon nanostructures sufficiently evenly with an oxidizing agent when the depressurization step and the surface treatment step have been carried out

[Dispersion Media]

Dispersion media used for the carbon nanostructure-containing liquid are not particularly limited and examples of usable dispersion media include water, 1-methyl-2-pyrrolidone, dimethylformamide, dimethylsulfoxide, dimethylacetamide, toluene, methanol, tetrahydrofuran, ethyl acetate, acetonitrile, ethylene glycol, methyl isobutyl ketone, and butyl alcohol. Water is preferred from the viewpoint of the easiness of carrying out the surface treatment step using an oxidizing agent.

[Depressurization]

Depressurization of the carbon nanostructure-containing liquid is not particularly limited. For example, depressurization can be carried out by placing a container, which contains therein a carbon nanostructure-containing liquid, under reduced pressure using a vacuum pump or other device, optionally while stirring the carbon nanostructure-containing liquid. In particular, depressurization is preferably carried out while stirring the carbon nanostructure-containing liquid.

The pressure at the time of depressurization is not particularly limited and is preferably, for example, 3.4 kPa or less in absolute pressure, and more preferably 2.6 kPa or less in absolute pressure.

The pressure at the time of depressurization is preferably one time or more and two times or less the vapor pressure of the dispersion medium at the temperature during depressurization (i.e., the vapor pressure of the dispersion medium at the temperature of the dispersion medium in the depressurization step), and preferably 1 time or more and 1.5 times or less.

When the carbon nanostructure-containing liquid is depressurized to a pressure not greater than the upper limit value in the depressurization step, it is possible to sufficiently evenly treat the carbon nanostructures with an oxidizing agent when the surface treatment step has been carried out. Thus, carbon nanostructures with further improved dispersion stability in carbon nanostructure dispersions can be obtained.

The liquid temperature of the carbon nanostructure-containing liquid at the time of depressurization is not particularly limited and can be, for example, 5° C. or higher and 30° C. or lower.

The time for depressurizing the carbon nanostructure-containing liquid is not particularly limited and is preferably, for example, 20 minutes or more. In particular, it is preferred that the depressurization of the carbon nanostructure-containing liquid is carried out for 20 minutes or more at a predetermined pressure after the carbon nanostructure-containing liquid has been depressurized to the predetermined pressure. When the depressurization time is set to not less than the lower limit value, it is possible to sufficiently evenly treat the carbon nanostructures with an oxidizing agent when the surface treatment step has been carried out. Thus, carbon nanostructures with further improved dispersion stability in carbon nanostructure dispersions can be obtained.

Depressurization of the carbon nanostructure-containing liquid may be carried out once or may be carried out two or more times by alternately carrying out depressurization and opening to atmosphere. In particular, for depressurization of the carbon nanotube-containing liquid, it is preferred to carry out one or more times an operation in which the carbon nanostructure-containing liquid is depressurized for 20 minutes or more, more preferably one or more times an operation in which the carbon nanostructure-containing liquid is depressurized to a predetermined pressure and maintained at the predetermined pressure for 20 minutes or more.

<Surface Treatment Step>

In the surface treatment step, an oxidizing agent is added to the carbon nanostructure-containing liquid after or during the depressurization step to effect oxidization treatment whereby the carbon nanostructures have a surface oxygen atom concentration of 7.0 at % or more. In the surface treatment step, surface-treated carbon nanostructures having a surface oxygen atom concentration of 7.0 at % or more can be obtained.

The surface treatment step may be carried out during the implementation of the depressurization step. However, the surface treatment step is preferably carried out after the depressurization step from the viewpoint of sufficiently evenly treating the carbon nanostructures with an oxidizing agent.

When the surface treatment step is carried out during the depressurization step, from the viewpoint of sufficiently evenly treating the carbon nanostructures with an oxidizing agent, it is preferred that the surface treatment step is initiated by adding an oxidizing agent after carrying out the depressurization of the carbon nanostructure-containing liquid for a sufficient time (e.g., 20 minutes or more).

[Carbon Nanostructure-Containing Liquid]

As the carbon nanostructure-containing liquid, a carbon nanostructure-containing liquid after or during the depressurization step is usually used as it is. Specifically, for example, when the surface treatment step is carried out after the depressurization step, the carbon nanostructure-containing liquid opened to the atmosphere after the depressurization is used as it is.

[Oxidizing Agent]

Oxidizing agents are not particularly limited as long as they can oxidize the carbon nanostructures and can be dissolved in the dispersion medium of the carbon nanostructure-containing liquid. Any oxidizing agents can be used herein. In particular, as the oxidizing agent, it is preferred to use at least one compound selected from the group consisting of nitric acid, sulfuric acid, hydrogen peroxide, ozone, oxygen, ammonium persulfate, and sodium hypochlorite, with nitric acid or ozone being preferred. When one or more of these oxidizing agents are used, the surface of the carbon nanostructures can be favorably treated, so that surface-treated carbon nanostructures having a surface oxygen atom concentration of 7.0 at % or more can be easily obtained.

Addition of the oxidizing agent into the carbon nanostructure-containing liquid is not particularly limited. Addition is preferably carried out while stirring the carbon nanostructure-containing liquid.

The oxidizing agent may be added in solid or solution form into the carbon nanostructure-containing liquid or may be blown in gaseous form into the carbon nanostructure-containing liquid.

The amount of the oxidizing agent added in the surface treatment step is not particularly limited as long as the surface oxygen atom concentration of the carbon nanostructures reaches 7.0 at % or more, and is appropriately set according to the type of the oxidizing agent and the like.

Oxidation of the carbon nanostructures by the oxidizing agent is not particularly limited as long as the surface oxygen atom concentration of the carbon nanostructures reaches 7.0 at % or more, and can be carried out at any temperature for any duration of time.

[Surface Oxygen Atom Concentration]

In the surface treatment step, surface-treated carbon nanostructures having a surface oxygen atom concentration of 7.0 at % or more are obtained. If the surface oxygen atom concentration of the surface-treated carbon nanostructures is less than 7.0 at %, even when the oxidizing agent has been added to the carbon nanostructure-containing liquid after or during the depressurization treatment step, it is not possible to obtain carbon nanostructures which can be used to prepare a carbon nanostructure dispersion having excellent dispersion stability.

From the viewpoint of obtaining carbon nanostructures having further improved dispersion stability in carbon nanostructure dispersions, the surface oxygen atom concentration of the surface-treated carbon nanostructures is preferably 10.0 at % or more, more preferably 13.0 at % or more, and even more preferably 14.0 at % or more. The surface oxygen atom concentration of the surface-treated carbon nanostructures is usually 30.0 at % or less.

Surface-treated carbon nanostructures obtained in the surface treatment step can be favorably used for example in the preparation of a carbon nanostructure dispersion.

Specifically, surface-treated carbon nanostructures obtained in the surface treatment step are present in the dispersion medium described above. Thus, by dispersing the surface-treated carbon nanostructures optionally after adjusting the pH of the dispersion medium, it is possible to obtain a carbon nanostructure dispersion. Alternatively, a carbon nanostructure dispersion can be obtained as follows: surface-treated carbon nanostructures are taken out from the dispersion medium by solid-liquid separation operations such as filtration, mixed with a separately provided solvent such as water, and dispersed in the solvent.

Dispersing methods are not particularly limited and dispersing can be carried out for example by the methods described in WO2014/097626 and WO 2016/013219.

The carbon nanostructure dispersion obtained in the manner described above is not susceptible to aggregation of carbon nanostructures and thus has excellent dispersion stability.

EXAMPLES

The present disclosure will be described in more detail below based on Examples, which however shall not be construed as limiting the scope of the present disclosure.

In Examples and Comparative Examples, the surface oxygen atom concentration and the surface carbon atom concentration of surface-treated carbon nanostructures, the maximum diameter of aggregated particles in carbon nanostructure dispersions, and the dispersion stability of carbon nanostructure dispersions were evaluated by the methods described below.

<Surface Oxygen Atom Concentration and Surface Carbon Atom Concentration>

1.0 g of a mixture solution containing surface-treated carbon nanostructures was filtered through a polytetrafluoroethylene (PTFE) membrane filter (pore diameter=10 μm) and the solid obtained was washed three times with 10 g of ion-exchanged water. The solid was then dried at 80° C. and 400 Pa (absolute pressure) for 15 hours to afford surface-treated carbon nanostructures. The surface oxygen atom concentration and surface carbon atom concentration of the surface-treated carbon nanostructures were analyzed by X-ray photoelectron spectroscopy (XPS) using a scanning X-ray photoelectron spectrometer (Quantum-2000, manufactured by PHI).

<Maximum Diameter of Aggregated Particles>

1.0 g of a carbon nanostructure dispersion (pH 8.0) was measured in a 5 mL sample bottle and adjusted to pH 1.0 by the addition of 0.1 mass % dilute nitric acid. After shaking gently several times, the dispersion was allowed to stand for 1 hour. The dispersion was then diluted with 4.0 g of ion-exchanged water and the diluted solution obtained was placed in between glass plates with a gap of 0.5 mm and observed with an optical microscope.

The obtained image was binarized by the image analysis software WinROOF and the largest particle size among the aggregated particles displayed on the screen was measured.

<Dispersion Stability>

The state of the diluted solution obtained in the measurement described in <Maximum Diameter of Aggregated Particles> above was observed with an optical microscope and evaluated based on the following criteria:

Good: Only some of the surface-treated carbon nanostructures dispersed were aggregated Bad: All of the surface-treated carbon nanostructures dispersed were aggregated

Example 1

<Preparation of Carbon Nanostructure-Containing Liquid>

First, as fibrous carbon nanostructures, carbon nanotubes ("ZEONANO SG101", manufactured by ZEON Corporation, single-walled CNTs, average diameter=3.5 nm, average length=400 μm, BET specific surface area=1,050 m$^2$/g, t-plot had a convex upward shape (position of bending point=0.6 nm), internal specific surface area S2/total specific surface area S1=0.24) were provided.

0.80 g of the carbon nanotubes and 54.8 g of ion-exchanged water as a dispersion medium were added into a 300 mL flask equipped with a condenser tube and a stirring blade to afford a carbon nanostructure-containing liquid.

<Depressurization Step>

The interior of the flask was depressurized (at 1.8 kPa for 30 minutes) using a vacuum pump at a liquid temperature of 15° C.

<Surface Treatment Step>

After completion of depressurization, the interior of the flask was returned to atmospheric pressure (opened to the atmosphere) and 87.9 g of nitric acid as an oxidizing agent (specific gravity=1.42, manufactured by Wako Pure Chemical Industries) was added into the carbon nanostructure-containing liquid obtained and the liquid was heated at an internal temperature of 110° C. for 8 hours under stirring to afford a mixture solution containing surface-treated carbon nanostructures (surface-treated carbon nanotubes).

The surface oxygen atom concentration and the surface carbon atom concentration of the surface-treated carbon nanostructures were measured. The results are shown in Table 1.

<Preparation of Carbon Nanostructure Dispersion>

3.0 g of the mixture solution containing the surface-treated carbon nanostructures obtained in the surface treatment step was weighed into a 50 mL sample bottle and diluted with 27.0 g of ion-exchanged water. Next, the diluted solution was adjusted to pH 8.0 by the addition of 0.1 mass % ammonia water and sonicated (output=180 W, frequency=42 kHz) for 50 minutes using an ultrasonic washer (ultrasonic washer 5510, manufactured by Branson) to disperse the carbon nanotubes. In this way a carbon nanostructure dispersion having a pH of 8.0 was obtained.

The maximum diameter of aggregated particles in the carbon nanostructure dispersion and the dispersion stability of the carbon nanostructure dispersion were measured and evaluated. The results are shown in Table 1.

Figure 1B:
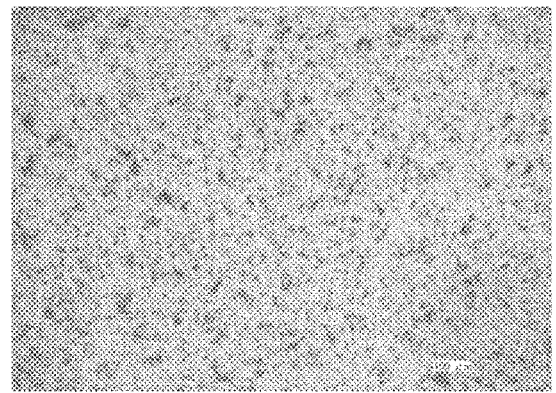
Figure 1C:
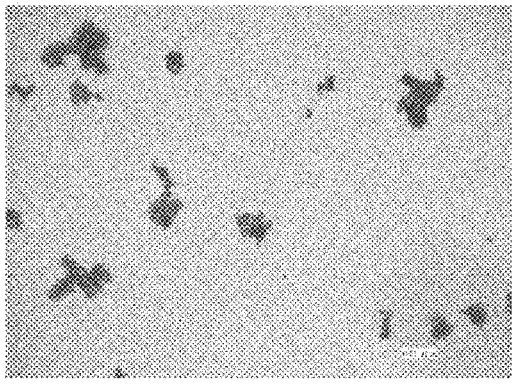
Figure 1D:
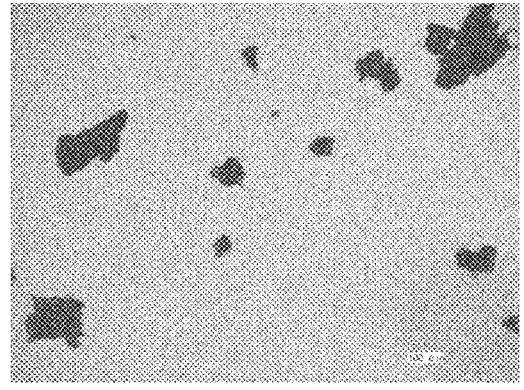

An optical micrograph of the carbon nanostructure dispersion was taken. The obtained optical micrograph is shown in FIG. 1

Example 2

A mixture solution containing surface-treated carbon nanostructures (surface-treated carbon nanotubes) was obtained using ozone as the oxidizing agent in the surface treatment step. Specifically, after adding 87.9 g of ion-exchanged water into the carbon nanostructure-containing liquid obtained after the depressurization step, ozone was added by bubbling ozone gas through the liquid for 10 hours at room temperature under stirring. Except for the foregoing, a carbon nanostructure dispersion was prepared as in Example 1, and measurements and evaluations were made as in Example 1. The results are shown in Table 1.

Comparative Example 1

A carbon nanostructure dispersion was prepared as in Example 1 except that the depressurization step was not carried out and nitric acid was added in the surface treatment step to a carbon nanostructure-containing liquid not subjected to the depressurization step. Measurements and evaluations were made as in Example 1. The results are shown in Table 1.

Comparative Example 2

A carbon nanostructure dispersion was prepared as in Example 2 except that the depressurization step was not carried out and in the surface treatment step ozone gas was bubbled through a carbon nanostructure-containing liquid not subjected to the depressurization step. Measurements and evaluations were made as in Example 1. The results are shown in Table 1.

Comparative Example 3

A mixture solution containing surface-treated carbon nanostructures (surface-treated carbon nanotubes) was obtained as in Example 1 except that in the surface treatment step the heating time was changed to 3 hours from 8 hours. The surface oxygen atom concentration and the surface carbon atom concentration of the surface-treated carbon nanostructures were measured as in Example 1. The results are shown in Table 1.

Next, 3.0 g of the mixture solution containing the surface-treated carbon nanostructures obtained in the surface treatment step was weighed into a 50 mL sample bottle and diluted with 27.0 g of ion-exchanged water. Next, the diluted solution was adjusted to pH 8.0 by the addition of 0.1 mass % ammonia water and sonicated (output=180 W, frequency=42 kHz) for 50 minutes using an ultrasonic washer (ultrasonic washer 5510, manufactured by Branson). However, a carbon nanostructure dispersion could not be obtained because the surface-treated carbon nanotubes were not dispersed. For this reason, measurements and evaluations of the maximum diameter of aggregated particles in a carbon nanostructure dispersion and the dispersion stability of a carbon nanostructure dispersion were not made and also imaging of an optical micrograph of a carbon nanostructure dispersion was not performed.

TABLE 1

|  | Ex. 1 | Ex. 2 | Comp. Ex. 1 | Comp. Ex. 2 | Comp. Ex. 3 |
| --- | --- | --- | --- | --- | --- |
| Surface oxygen atom concentration [at %] | 14.0 | 14.6 | 11.7 | 12.7 | 6.6 |
| Surface carbon atom concentration [at %] | 86.0 | 85.4 | 88.3 | 87.3 | 93.4 |

TABLE 1-continued

|  | Ex. 1 | Ex. 2 | Comp. Ex. 1 | Comp. Ex. 2 | Comp. Ex. 3 |
|---|---|---|---|---|---|
| Preparation of dispersion | Successful | Successful | Successful | Successful | Failed |
| Maximum diameter of aggregated particles [μm] | 12 | 18 | 101 | 123 | — |
| Dispersion stability | Good | Good | Bad | Bad | — |

It can be seen from Table 1 that Examples 1 and 2 wherein the depressurization step and the surface treatment step were carried out and the surface oxygen atom concentration was set to 7.0 at % or more provided a carbon nanostructure dispersion having excellent dispersion stability. On the other hand, it can be seen that Comparative Examples 1 and 2 wherein the depressurization step was not carried out provided a carbon nanostructure dispersion with low dispersion stability. Of note, the carbon nanostructure dispersions prepared in Examples 1 and 2 showed excellent dispersion stability even when the pH was greatly changed from 8.0 to 1.0. Thus, it can be seen that even when small changes in pH in the subsequent step (e.g., due to contact with acidic cation exchange resin having a sulfonic acid group on the surface, or volatilization of ammonia component) have occurred after preparation of a carbon nanostructure dispersion, problems caused by aggregation do not easily occur.

From the results of Comparative Example 3 shown in Table 1, it can be seen that if the surface oxygen atom concentration is 6.6 at % even when the depressurization step and the surface treatment step have been carried out, the dispersibility of surface-treated carbon nanostructures does not increase and therefore a carbon nanostructure dispersion cannot be obtained.

INDUSTRIAL APPLICABILITY

According to the disclosed method of producing surface-treated carbon nanostructures, it is possible to obtain carbon nanostructures which can be used to prepare a carbon nanostructure dispersion having excellent dispersion stability.

The invention claimed is:

1. A method of producing surface-treated carbon nanostructures, comprising:
a depressurization step wherein a carbon nanostructure-containing liquid which comprises carbon nanostructures and a dispersion medium is depressurized to below atmospheric pressure; and
a surface treatment step wherein an oxidizing agent is added in the carbon nanostructure-containing liquid after or during the depressurization step so that the carbon nanostructures have a surface oxygen atom concentration of 7.0 at % or more, wherein
the carbon nanostructures comprise carbon nanotubes.

2. The method of producing surface-treated carbon nanostructures according to claim 1, wherein, in the depressurization step, the carbon nanostructure-containing liquid is depressurized to a pressure that is not more than two times a vapor pressure of the dispersion medium at a temperature of the dispersion medium during depressurization.

3. The method of producing surface-treated carbon nanostructures according to claim 1, wherein an operation in which the carbon nanostructure-containing liquid is depressurized for 20 minutes or more is carried out one or more times in the depressurization step.

4. The method of producing surface-treated carbon nanostructures according to claim 1, wherein a concentration of the carbon nanostructures in the carbon nanostructure-containing liquid is 5% by mass or less.

5. The method of producing surface-treated carbon nanostructures according to claim 1, wherein the oxidizing agent is at least one compound selected from the group consisting of nitric acid, sulfuric acid, hydrogen peroxide, ozone, oxygen, ammonium persulfate, and sodium hypochlorite.

6. The method of producing surface-treated carbon nanostructures according to claim 1, wherein the carbon nanostructures exhibit a convex upward shape in a t-plot obtained from an adsorption isotherm.

7. The method of producing surface-treated carbon nanostructures according to claim 1, wherein the carbon nanostructures satisfy the relationship $0.05 \leq S2/S1 \leq 0.30$, where S1 is a total specific surface area and S2 is an internal specific surface area, S1 and D2 being obtained from a t-plot obtained from an adsorption isotherm.

8. The method of producing surface-treated carbon nanostructures according to claim 1, wherein the dispersion medium is depressurized to 3.4 kPa or less in absolute pressure.

9. The method of producing surface-treated carbon nanostructures according to claim 1, wherein the dispersion medium is depressurized to 2.6 kPa or less in absolute pressure.

* * * * *